United States Patent
Fries

[15] 3,702,624
[45] Nov. 14, 1972

[54] PISTON PUMP
[72] Inventor: Hugo Fries, Urach, Germany
[73] Assignee: Pumpenfabrik Urach, Urach, Germany
[22] Filed: Sept. 12, 1969
[21] Appl. No.: 857,373

[30] Foreign Application Priority Data
Sept. 17, 1968  Germany..........P 17 28 243.8

[52] U.S. Cl. ............137/512, 137/512.3, 137/512.5, 137/516.23, 417/567
[51] Int. Cl.............................................F16k 15/08
[58] Field of Search.....137/512, 512.1, 512.3, 512.5, 137/516.11, 516.13, 516.15; 417/567, 569

[56] References Cited

UNITED STATES PATENTS

| | | |
|---|---|---|
| R25,899 | 11/1965 | Waibel..............137/516.15 X |
| 3,106,169 | 10/1963 | Prosser et al. .........137/512 X |
| 3,309,013 | 3/1967 | Bauer ..............137/516.13 X |
| 3,309,014 | 3/1967 | Bauer ..............137/516.13 X |
| 3,508,849 | 4/1970 | Weber..............137/516.13 X |
| 3,526,246 | 9/1970 | Leitgeb...................137/512.3 |

Primary Examiner—Samuel B. Rothberg
Assistant Examiner—David J. Zobkiw
Attorney—Michael S. Striker

[57] ABSTRACT

A piston pump in which the cylinder head encloses the valve housing in such a manner that the delivery valve chamber which is located behind the delivery valve, as seen in the direction of flow of the fluid conveyed through the pump, needs to be sealed relative to the outside only by a single high-pressure gasket which is provided between this valve chamber and the intake line.

10 Claims, 5 Drawing Figures

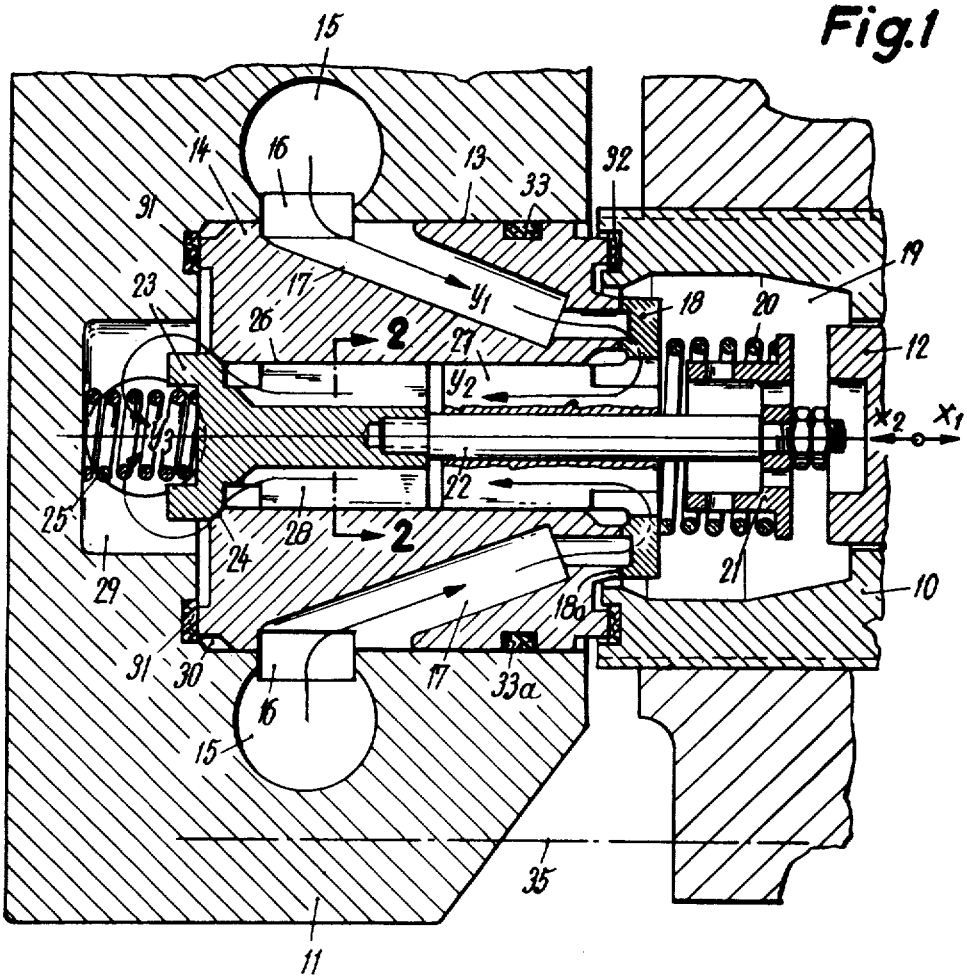
Fig.1
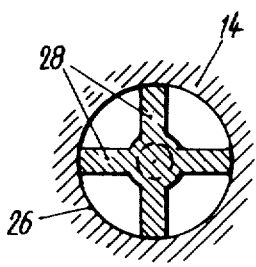
Fig. 2
Fig. 1a

INVENTOR
HUGO FRIES

BY Michael J. Striker
ATTORNEY

PISTON PUMP

The present invention relates to a piston pump especially for high pressures which comprises a valve housing which is inserted into the cylinder head, and a delivery-valve chamber which is located behind the delivery valve, as seen in the direction of flow of the fluid conveyed through the pump. If such a fluid is to be conveyed under high pressures, for example, up to 500 or 1,000 atm., or if it is of a particular type, for example, a radioactive fluid, it is an absolute necessity that the pump housing will be tightly sealed toward the outside.

It is therefore an object of the present invention to provide a piston pump which for sealing it so tightly and fully reliable relative to the outside requires only very simple means and at the fewest possible points of the pump.

One important feature of the invention therefore essentially consists in providing only a single high-pressure gasket between the cylinder head and the valve housing for sealing the delivery valve chamber relative to the intake line by enclosing the delivery valve chamber within the cylinder head without any seams toward the outside at least up to the intake line which is likewise enclosed by the cylinder head.

By designing the pump in this manner there is no longer any need to provide any further means for sealing the delivery valve chamber within the housing which would otherwise be required under the high pressures which are to produced by such a pump. According to the invention it is therefore only necessary to seal the delivery valve chamber relative to the intake chamber. However, since this single high-pressure gasket is an internal gasket, any leakage of the fluid under pressure from the delivery valve chamber to the intake chamber is practically without any consequence since the pressures cannot escape toward the outside and the fluid which might leak through to the intake chamber will again be taken up by the fluid passing through this chamber and be passed once more to the delivery valve chamber.

Aside from this single internal high-pressure gasket, it is another feature of the invention to provide only low-pressure gaskets for effecting the sealing action toward the outside. This applies especially if the cylinder housing and the valve housing are integrally connected to each other or if the cylinder housing and the cylinder head are welded together subsequent to their installation. If, however, for example, for reasons of installation, a valve housing is provided which consists of several parts, an additional high-pressure gasket may be provided for sealing the pump chamber relative to the outside.

Another object of the invention consists in providing an especially advantageous arrangement of the delivery valve means and/or the intake valve means on the valve housing which may, for example, also be made integral with the cylinder housing of the machine, and which arrangement permits the valve means to be easily installed. A further feature of the invention consists in the particular design and construction of these valve means and especially in their particular combination with the required sealing means.

These and additional objects, features and advantages of the present invention will become further apparent from the following detailed description thereof which is to be read with reference to the accompanying drawings, in which FIG. 1 shows an axial section of the pump chamber and the associated parts of a first embodiment of the machine according to the invention;

FIG. 1b is a partial axial cross-section of a slightly modified construction;

FIG. 2 shows a cross section which is taken along the line 2—2 of FIG. 1;

FIG. 3 shows an axial section similar to that according to FIG. 1 of a second embodiment of the invention; while

Figure 3:
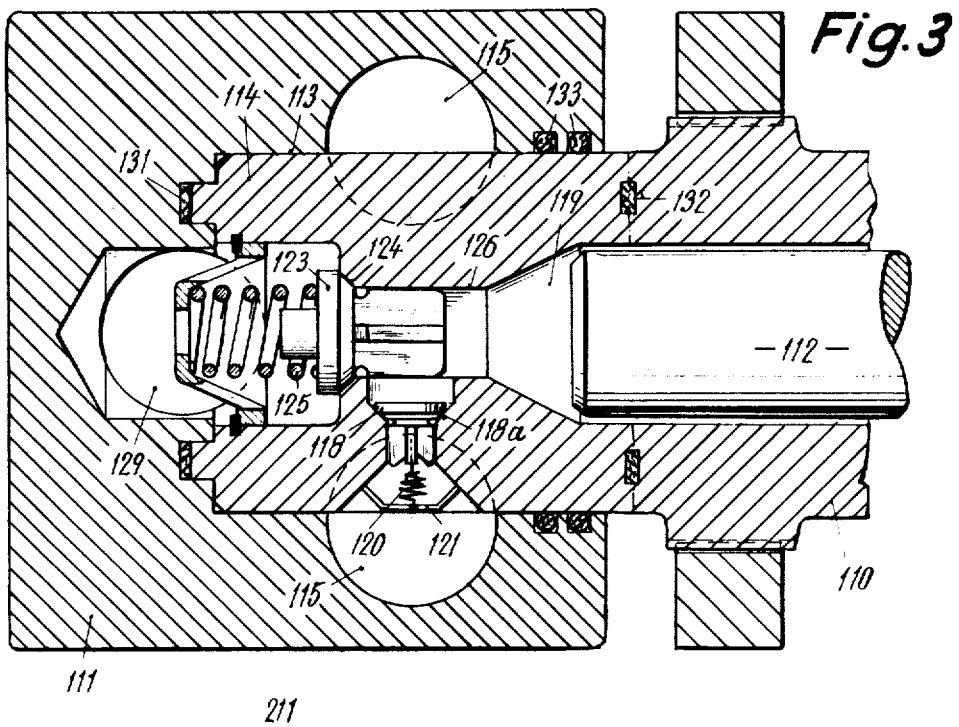

In the drawings, FIG. 1 illustrates generally a first embodiment of the invention in which the cylinder housing is designated by the numeral 10 and the cylinder head by the numeral 11. At the inside of the cylinder housing 10 the piston 12 is movable back and forth in the direction of the arrows $x_1$ and $x_2$, carrying out its intake stroke in the direction $x_1$ and its compression stroke in the direction $x_2$.

Cylinder head 11 is provided with a socket bore 13 through the open end of which the valve housing 14 is inserted so as to fit tightly into this bore. The fluid, especially a liquid, which is to be conveyed by the pump is conducted through one or more intake channels 15, which may also be combined to form an annular channel, for example, the channel 16, to bores 17 which lead to an intake valve 18 which in this embodiment of the invention is provided in the form of an annular valve which is acted upon by a spring 20 which tends to press it upon a seat 18a in the valve housing 14 so as to close the intake channels 17 relative to the pump chamber 19. The rear end of spring 20 is supported on the flange of a cap-shaped member 21 which is connected by a valve rod 22 to the delivery valve 23 which by the action of spring 20 is adapted to be pressed upon a seat 24 at the opposite end of the valve housing 14. If desired, the force of spring 20 may be increased by an additional spring 25 which acts directly upon the delivery valve 23. The intake valve 18 and the delivery valve 23 are provided with radial webs 27 and 28 for guiding them within a central bore 26 of valve housing 14.

After the insertion of the valve housing 14 into the bore 13 of the cylinder head 11, the latter tightly encloses the valve housing in such a manner that the delivery valve chamber 29 which is located behind the delivery valve 23, as seen in the direction of flow $y_1$, $y_2$, $y_3$ of the fluid to be conveyed, is not connected to the outside by any gap within the cylinder head 11 which would have to be sealed. The only gap adjacent to the valve chamber 29 is a gap 30 between this valve chamber and the intake channels 15, 16, 17, and this gap 30 is tightly sealed by an internal annular high-pressure gasket 31.

In FIG. 1 which is called FIG. 1a, the valve housing 14 forms an element separate from the cylinder housing 10. Therefore, an additional high-pressure gasket 32 is inserted in this case between the valve housing 14 and the cylinder housing 10 for sealing the pump chamber 19 toward the outside and another gasket 33 for sealing the intake line 15, 16, 17 toward the outside.

This gasket 33, however, only has to be a simple low-pressure gasket to produce a secure sealing effect.

In FIG. 1a, there is no need for the high-pressure gasket 32 since the cylinder housing 10 and the cylinder head 11 are welded together as indicated by the welded joint 34. Such a welded joint now permits the parts 10 and 11 to be absolutely sealed toward the outside as if they were integral with each other. This welded joint may also be provided in the form of a bead, as indicated in FIG. 1b, which may again be removed without any great difficulties if it becomes necessary to replace any parts at the inside of the machine. It is necessary to provide for this possibility especially if very high pressures are produced by the pump and particularly insofar as the valve housing 14 is concerned since after a certain period of operation of the pump this valve housing has the tendency to be damaged under the severe alternating stresses to which it is continuously subjected.

In the embodiment as shown in FIG. 1 and even in the welded embodiment as shown in FIG. 1a it is advisable to secure the cylinder head 11 and the cylinder housing 10 to each other by traction bolts, as indicated by the dot-and-dash line 35.

FIG. 3 illustrates a second main embodiment of the invention in which the parts are similar to those as shown in FIG. 1 are designated by the same numerals which, however, are raised by 100 over those in FIG. 1. The most important difference between these two embodiments is the fact that in the embodiment according to FIG. 3 the intake valves 118 are located within the valve housing 114. Preferably a plurality of these intake valves 118 extend in radial directions within the valve housing 114 and at equal peripheral distances from each other within radial apertures and they are made of such dimensions that they may be inserted through the central bore 126 of valve housing 114 into these apertures and then be placed on their seats 118a. Springs 120, for example, traction springs, the radially outer ends of which may be hooked into transverse brackets 121 tend to maintain the intake valves 118 on their seats 118a within the radial apertures. The delivery valve 123 is also in this case pressed upon its seat 124, for example, by a spring 125.

Since the intake valves 118 may be inserted through the bore 126, the valve housing 114 and the cylinder housing 110 may together form a single integral element. Aside from the high-pressure gasket 131 between the delivery valve chamber 129 and the intake line 115, it is in this case only necessary to provide a low-pressure gasket 133. If, however, the valve housing 114 should be replaceable independently of the cylinder housing 110, an additional high-pressure gasket 132 may also in this case be provided. This gasket may, however, also be omitted if the two parts 110 and 114 are tightly secured to each other by a welded joint.

Figure 4:
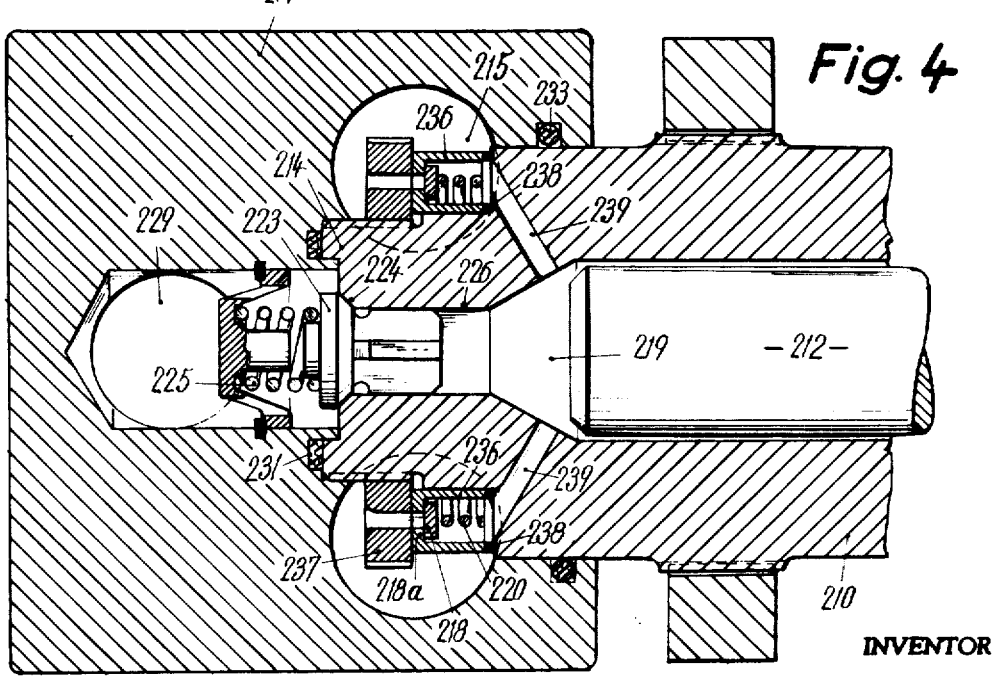
FIG. 4 shows a similar axial section of a third embodiment of the invention.

FIG. 4 illustrates a third main embodiment of the invention in which the parts which are similar to those of the first embodiment as shown in FIG. 1 are likewise designated by the same numerals which, however, are raised by 200 over those in FIG. 1. This embodiment differs from that as shown in FIG. 2 primarily by being provided with an axially movable annular intake valve 218 in place of the radially extending intake valves 118. This valve 218 which surrounds the valve housing 214 forms a disk and is pressed by a coil spring 220 upon its seat 218a which forms the bottom of a ring 236 of a substantially U-shaped cross section which is pressed by an annular nut 237 in the direction toward a shoulder on the cylinder housing 210 which carries a gasket ring 238 against which the open side of ring 236 is pressed. The annular nut 237 and the bottom of ring 236 upon which the valve disk 218 engages are provided with substantially corresponding ducts leading to the intake line 215. At the other side of valve disk 218, the inner side of ring 236 is connected by apertures in the gasket ring 238 and by channels 239 extending through the wall of the cylinder housing 210 with the pump chamber 219 which, in turn, is connected by the central bore 226 with the delivery valve chamber 229 in the cylinder head 211 of the machine. When the delivery valve 223 is pressed by spring 225 upon its seat 224 at the end of bore 226, it seals this end tightly relative to the delivery valve chamber 229.

This valve chamber 229 is again sealed relative to the intake line 215 by a high-pressure gasket 231. Although in this particular case the annular gasket 238 is also a high-pressure gasket, it merely forms an internal sealing element which does not seal the pump chamber 218 from the outside buy only from the intake line 215.

In both embodiments of the invention as illustrated in FIGS. 3 and 4, the valve housing 114 or 214 is integrally combined with the cylinder housing 110 or 210, respectively. Therefore, aside from an internal high-pressure gasket 131 or 231 and the additional internal high-pressure gasket 238 according to FIG. 4, there is only a single low-pressure gasket 133 or 233 required for sealing the intake line 115 or 215 relative to the outside. If, however, the cylinder housing 110 or 210 and the valve housing 114 or 214 are desired to form two separate elements so as to permit the valve housing to be removable from the machine independently of the cylinder housing, the associated housings may either be sealed relative to each other by a high-pressure gasket in the manner as shown in FIG. 1a or they may be connected to each other by a welded joint in the manner as shown in FIG. 1b.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. A piston pump, especially for conveying fluid under high pressure, comprising, in combination, a one-piece cylinder head being formed with a blind bore having a large-diameter bore portion at the open end and a small-diameter bore portion at the closed end thereof and forming a shoulder face between said open and said closed end, said small-diameter bore portion constituting a delivery chamber; a valve housing located in said large-diameter bore portion and having a maximum diameter substantially equal to that of said large-diameter bore portion so as to be insertable and removable through said open end of said bore, said valve housing having at one end an end face facing said shoulder face of said cylinder head; a cylinder housing connected to the other end of said valve housing, said valve housing and said cylinder housing defining a pump chamber; intake passage means extending through said cylinder head and said valve housing and communicating with said pump chamber; intake valve means for controlling flow of fluid from said intake passage means into said pump chamber; further passage means extending through said valve housing and providing communication between said pump chamber and said delivery chamber; delivery valve means for controlling flow of fluid from said pump chamber through said further passage means into said delivery chamber, said intake valve means and said delivery valve means are respectively disposed at opposite ends of said valve housing, respectively facing said pump chamber and said delivery chamber, and are adapted to open in opposite directions to each other; spring means having one end acting upon said intake valve means and tending to maintain the same in closed position; means for supporting the other end of said spring means; an element connecting said supporting means substantially rigidly to said delivery valve means so that said spring means also tend to maintain said delivery valve means in closed position; delivery passage means communicating with said delivery chamber downstream of said delivery valve means; and a high-pressure gasket between said faces to prevent escape of fluid from said delivery chamber between said faces.

2. A piston pump as defined in claim 1, and further comprising at least one annular low-pressure gasket surrounding said valve housing in the region of said open end of said bore in said cylinder head.

3. A piston pump as defined in claim 1, wherein said valve housing and said cylinder housing have end surfaces facing each other and including means for connecting said housings to each other and an other high-pressure gasket between said end surfaces and sealing said pump chamber against the outer atmosphere.

4. A piston pump as defined in claim 1, wherein said delivery valve means is located at one end of said further passage means and said intake valve means is annular and surrounds the other end of said further passage means, said intake passage means through said valve housing being located radially outwardly of said further passage means.

5. In a piston pump, a combination comprising a body means defining a pump chamber; fluid intake passage means in said body means communicating with said pump chamber for feeding fluid into said chamber; a delivery chamber in said body means; further passage means in said body means providing communication between said pump chamber and said delivery chamber; intake valve means movable between open and closed positions for controlling flow of fluid from said fluid intake passage means to said pump chamber; delivery valve means movable between open and closed position for controlling flow of pressurized fluid from said pump chamber to said delivery chamber; a spring engaging with one end one of said valve means and tending to maintain the latter in said closed position; and means supporting the other end of said spring and connected to the other of said valve means so that said spring tends to hold also the other of said valve means in closed position.

6. A combination as defined in claim 5, wherein said intake valve means and said delivery valve means are coaxially arranged, said one of said valve means being an annular valve and said supporting and connecting means comprises a valve stem on the other of said valve means projecting with a portion thereof through and beyond said annular valve and an abutment on said portion of said valve stem against which the other end of said spring abuts.

7. A combination as defined in claim 6, wherein said one valve means constitutes said inlet valve means and said other valve means constitutes said delivery valve means.

8. A combination as defined in claim 7, said body means comprising a cylinder head formed with a blind bore, a valve housing in said blind bore, a cylinder housing connected to one end of said valve housing which faces away from the closed end of said blind bore and defining with said valve housing said pumps chamber, said further passage means communicating at one end with said pump chamber and extending through said valve housing, said intake passage means surrounding said one end of said further passage means, said one means being located at said one end of said valve housing and said other valve means at the other end thereof, said valve stem extending through said further passage means.

9. A combination as defined in claim 5, said body means including a valve housing through which said fluid intake passage means and said further passage means extend, and valve seats for said valve means provided on opposite ends of said valve housing.

10. A combination as defined in claim 9, and including an additional spring pressing said delivery valve means against its valve seat.

* * * * *